United States Patent
Petry et al.

(10) Patent No.: US 11,630,502 B2
(45) Date of Patent: Apr. 18, 2023

(54) HIERARCHICAL STATE SAVE AND RESTORE FOR DEVICE WITH VARYING POWER STATES

(71) Applicant: Advanced Micro Devices, Inc., Santa Clara, CA (US)

(72) Inventors: John P. Petry, Santa Clara, CA (US); Alexander J. Branover, Boxborough, MA (US); Benjamin Tsien, Santa Clara, CA (US); Christopher T. Weaver, Boxborough, MA (US); Stephen V. Kosonocky, Fort Collins, CO (US); Indrani Paul, Austin, TX (US); Thomas J. Gibney, Boxborough, MA (US); Mihir Shaileshbhai Doctor, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/390,486

(22) Filed: Jul. 30, 2021

(65) Prior Publication Data
US 2023/0030985 A1    Feb. 2, 2023

(51) Int. Cl.
*G06F 1/32* (2019.01)
*G06F 1/3287* (2019.01)

(52) U.S. Cl.
CPC .................. *G06F 1/3287* (2013.01)

(58) Field of Classification Search
CPC ........................................... G06F 1/3287
See application file for complete search history.

(56) References Cited

U.S. PATENT DOCUMENTS

| | | |
|---|---|---|
| 2010/0077244 A1 | 3/2010 | Nowark et al. |
| 2011/0078463 A1* | 3/2011 | Fleming ................ G06F 1/3287 |
| | | 713/300 |
| 2015/0198986 A1 | 7/2015 | Chang et al. |
| 2016/0077905 A1 | 3/2016 | Menon et al. |
| 2019/0213973 A1 | 7/2019 | Jung |

FOREIGN PATENT DOCUMENTS

KR    10-2019-0017552 A    2/2019

* cited by examiner

*Primary Examiner* — Stefan Stoynov
(74) *Attorney, Agent, or Firm* — Volpe Koenig

(57) ABSTRACT

A disclosed technique includes triggering a change for a first set of one or more functional elements and for a second set of one or more functional elements from a high-power state to a low-power state; saving first state of the first set of one or more functional elements via a first set of one or more save-state elements; saving second state of the second set of one or more functional elements via a second set of one or more save-state elements; powering down the first set of one or more functional elements and the second set of one or more functional elements; and transmitting the first state and the second state to a memory.

20 Claims, 3 Drawing Sheets

HIERARCHICAL STATE SAVE AND RESTORE FOR DEVICE WITH VARYING POWER STATES

BACKGROUND

Computing hardware consumes a large amount of power. Mobile devices that rely on batteries to supply this power benefit from power reduction in terms of increased operating duration. Power consumption concerns are thus a perpetual area for improvement for computing hardware.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes triggering a change for a first set of one or more functional elements and for a second set of one or more functional elements from a high-power state to a low-power state; saving first state of the first set of one or more functional elements via a first set of one or more save-state elements; saving second state of the second set of one or more functional elements via a second set of one or more save-state elements; powering down the first set of one or more functional elements and the second set of one or more functional elements; and transmitting the first state and the second state to a memory.

Figure 1:
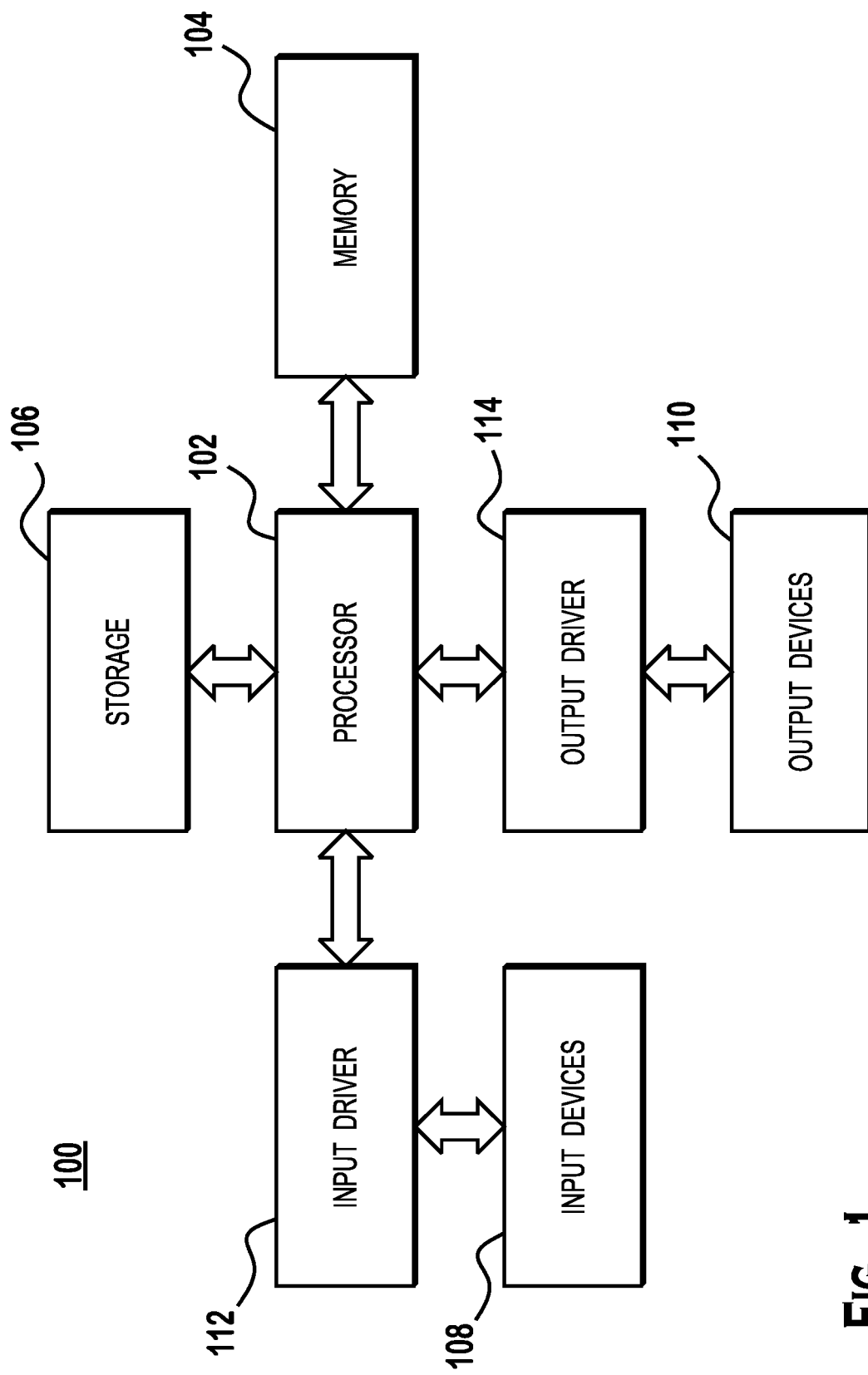
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die or multiple dies, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example and without limitation, random access memory (RAM), dynamic RAM, static RAM ("SRAM"), or any other type of non-volatile memory, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
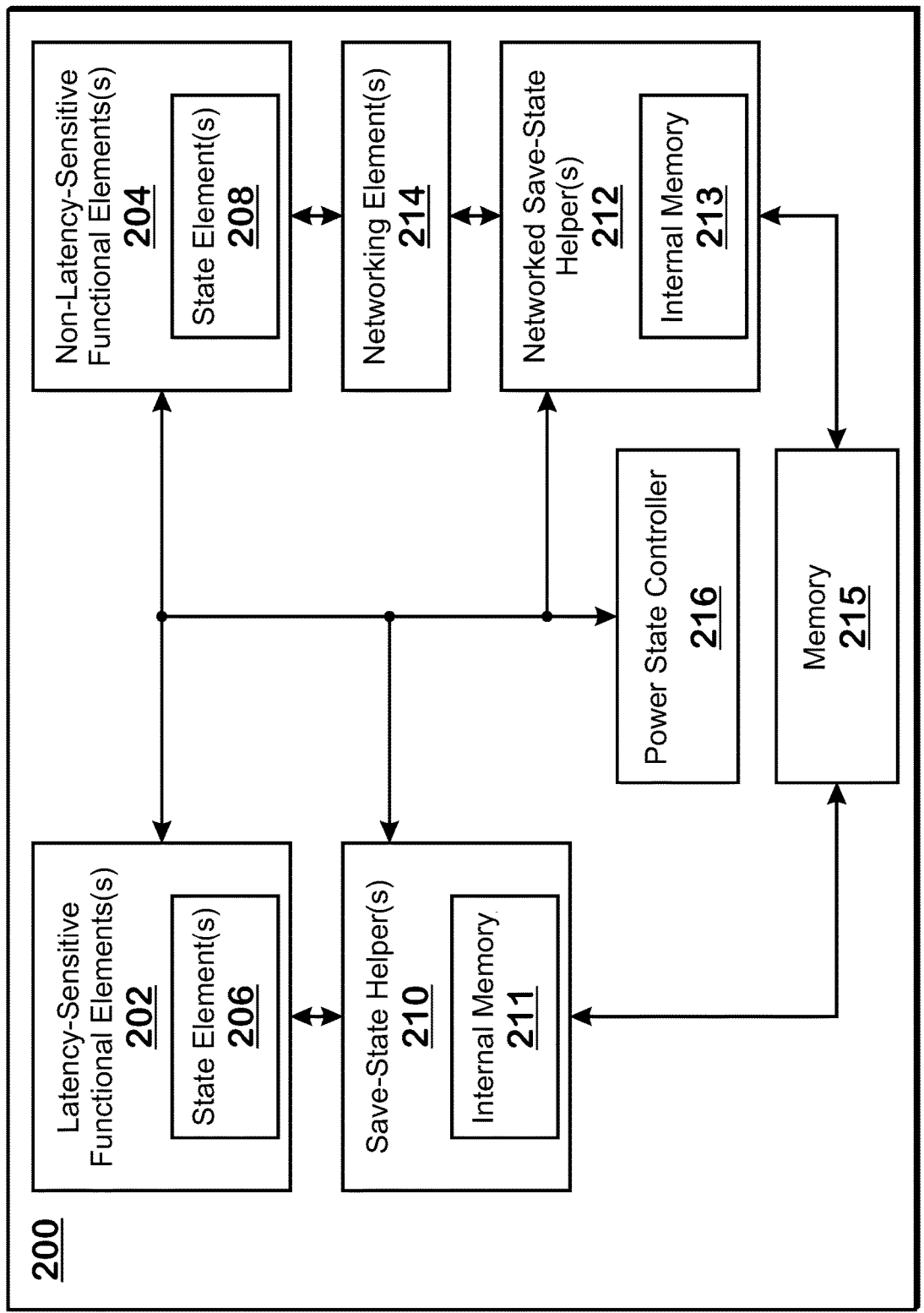
FIG. 2 illustrates a device that is an example implementation of the device of FIG. 1.

FIG. 2 illustrates a device 200 that is an example implementation of the device 100 of FIG. 1. The device 200 includes, without limitation, a set of one or more latency-sensitive functional elements 202, a set of non-latency-sensitive functional elements 204, save-state helpers 210, networked save-state helper(s) 212, network elements 214, a power state controller 216, and a memory 215. The power state controller 216 controls power states of the various elements of the device 200, powering such elements up or down based on operating conditions. The "functional elements" (which collectively refers to the latency-sensitive functional elements 202 and non-latency sensitive functional elements 204) perform operations of the device 200. Save-state helpers 210 and networked save-state helpers 212 save state of the functional elements in the situation that such functional elements are powered down to a power state in which internal memory is unable to store state data for such elements. The state is saved to memory 215. In different examples, the memory 215 is a local memory, a memory that is external to the power state controller 216, or a combination of both.

The latency-sensitive functional elements 202 are various elements of the device 200 that perform various types of functionality. Examples of latency-sensitive functional elements 202 include memory controllers, an input/output hub, a peripheral bus controller, a high bandwidth data fabric coupling memory 215 to elements such as a display controller, and other components. The latency-sensitive functional elements 202 are latency-sensitive in the sense that aspects of operation of these elements require the elements to have a relatively low amount of delay between beginning switching power states and arriving at the new power state, as compared to the non-latency sensitive functional elements 204. In an example, a display controller is a latency-sensitive functional element 202. The display controller reads pixel data out to a display. Excessive downtime for such an element could lead to visual glitches. Thus it is important for the downtime of such an element to be minimized. Minimizing such downtime reduces the amount of time between requesting that the display controller be placed into a different power state (e.g., powered down or powered up) and actually placing the display controller in that different power state, which provides increased uptime for the display controller, reducing or eliminating the possibility of visual glitches.

Non-latency sensitive functional elements 204 are functional elements that are less sensitive than the latency-sensitive functional elements 202 to latency between beginning power state change and actually performing the power state change. Some non-latency sensitive functional elements 204 also are dependent on latency sensitive functional elements 202. Some examples of non-latency-sensitive functional elements 204 include multimedia processors, such as a camera processor, or other multimedia processors, debug blocks, video codec blocks, other support blocks, a display controller, and other elements.

A networking element 214 is an element that acts as an interconnect between the various elements of the device 200, distributing communications between the various functional elements.

The non-latency-sensitive functional elements 204 are illustrated as being coupled to the networking elements 214, though it is possible for one or more of the latency-sensitive functional elements 202 to also be coupled to the networking elements 214. However, the latency-sensitive elements are serviced by save-state helpers 211 that are coupled to the latency-sensitive functional elements 202 "directly"—that is, without intervening networking elements 214.

The power-state controller 216 is capable of controlling the power state of one or more portions (sometimes referred to herein as "power domains") of the device 200. Different portions of the device 200 are capable of being set to different power states individually. A power state includes a definition of the degree to which a portion of the device 200 is powered on or off. In some examples, a portion of the device 200 has differing capabilities depending on which power state the device 200 is in. In an example, any of the latency-sensitive functional elements 202 or non-latency-sensitive functional elements 204 are capable of being set into lower or higher power states. In general, the differing capabilities in differing power states trade capability for power consumption. Specifically, by modifying operations for one or more components of a portion of the device 200, the capabilities associated with that component are modified, but the power that would normally be used by that component is not expended. In general, the power state controller 216 controls these power states according to various inputs, such as inputs from hardware units within the device 200 or software modules executing on a processor such as an operating system.

The save-state helpers 210 and networked save-state helpers 212 provide state save functionality for the latency-sensitive functional elements 202 and non-latency-sensitive functional elements 204, respectively. Save-state functionality includes saving state data from the latency-sensitive functional elements 202 and non-latency-sensitive functional elements 204 into memory 215. Herein, the save-state helpers 210 and networked save-state helper 212 are sometimes referred to as "save-state units." The state data that is saved includes any type of state data, such as register values, values stored within internal memory of the functional units, or any such data. It is possible that the state data to be saved for any particular functional unit to originate from several different registers or memories of the functional unit, and/or from non-contiguous portions of the same memory (thus being at non-contiguous address ranges).

Memory 215 is a storage device that stores state data of the functional elements when those functional elements are powered down, so that the state data can be provided back to the functional elements when those functional elements are powered back up. In various examples, the memory 215 is main memory, generally accessible to the components of the device 200, or is a different type of memory. In some examples, the memory 215 is a memory of the power state controller 216. In some examples, the memory 215 is within the same power domain as the power state controller 216. A "power domain" refers to a portion of the device 200 that is capable of being placed into a particular power state independently of other power domains.

In some example modes of operation, the power state controller 216 remains in a powered up state even when most or all of the other power domains (e.g., most or all of the latency-sensitive functional elements 202 and most or all of the non-latency-sensitive functional elements 204). This occurs so that the power state controller 216 is able to monitor aspects of the device 200 and change the power state of one or more components when needed. In implementations where the memory 215 is in the same power domain as the power state controller 216, the memory 215 is able to remain powered on and maintain the saved state even while the other components such as the latency-sensitive functional elements 202 and the non-latency-sensitive functional elements 204 are powered down.

In some implementations, one or more of the latency-sensitive functional elements 202 is coupled to the networking elements 214. In such implementations, a distinction between the latency-sensitive functional elements 202 and the non-latency-sensitive functional elements 204 is that for the latency-sensitive functional elements 202 the save-state helpers 210 are in direct communication with the latency-sensitive functional elements 202. By contrast, the non-latency-sensitive functional elements 204 are in communication with the networked save-state helpers 212 via the networking elements 214. The fact that the latency-sensitive functional elements 202 are directly coupled to the save-state helpers 210 means that the save-state helpers 210 are able to access the latency-sensitive functional elements 202 with reduced latency as compared with the networked save-state helpers 212, as described in further detail elsewhere herein.

In some implementations, the networking element 214 is a data network that is internal to the device 200. In such implementations, the networking elements 214 provides communication between the non-latency-sensitive functional elements 204 and, in some implementations, one or more of the latency-sensitive functional elements 202.

As described elsewhere herein, the power state controller 216 determines situations in which various elements (e.g., latency-sensitive functional elements 202 and/or non-latency-sensitive functional elements 204) of the device 200 are to be powered down. In some power states, a latency-sensitive functional element 202 or non-latency-sensitive functional element 204 is unable to retain state due to powering down internal memory (state elements 206 or state elements 208). Thus the state of such elements is saved to memory 215 in order to allow the elements to return to the state when powered up again.

The save state units include internal memory 211 that temporarily stores state data from one or more of the latency-sensitive functional elements 202 and the non-latency-sensitive functional elements 204 when such elements are in the process of being powered down. The save state units transmit this state data to the memory 215 and then, themselves, are powered down. The save state units are able to operate concurrently with each other. In addition, the latency-sensitive functional elements 202 and non-latency-sensitive functional elements 204 are able to be powered down earlier than if the save state units were not present, since the latency-sensitive functional elements 202 and non-latency-sensitive functional elements 204 would need to remain powered up until state is saved to memory, even if such elements would stall due to limited bandwidth to the memory 215. In other words, the save state units serve to cache state data for later transfer to the memory 215, thereby allowing the latency-sensitive functional elements 202 and non-latency-sensitive functional elements 204 to be powered down earlier than if the save state units did not exist.

The networked save-state helpers 212 communicate with the non-latency sensitive functional elements 204 via the networking elements 214. Thus, the ability to transfer data from the non-latency-sensitive functional elements 204 to the networked save-state helpers 212 is limited by the clock rate available to the network elements 214. However, the save-state helpers 210, which are coupled to the latency-sensitive functional elements 202 without the networking elements 214, are able to communicate with the latency-sensitive functional elements 202 at any technically feasible clock frequency, including clock frequencies that are faster than the clock frequencies used by the networking elements 214, and/or faster than the clock frequencies of the latency-sensitive functional elements 202. In some implementations, one advantage of the save-state helpers 210 being coupled to the latency-sensitive functional elements 202 without the networking elements 214 is that the save-state helpers 210 are "dedicated" to the latency-sensitive functional elements 202, meaning that a particular save-state helper 210 serves not more than one latency-sensitive functional element 202, and is thus able to perform save and restore functionality with minimal latency. In some implementations, at least one save-state helper 215 is coupled to at least one latency-sensitive functional element 202 with no elements therebetween. In other words, at least one save-state helper 215 is directly coupled to at least one latency-sensitive functional element 202. In some implementations, each save-state helper 215 is directly coupled to a respective functional element 202.

In some implementations, one or more of the save-state helpers 210 and networked save-state helpers 212 are programmable direct memory access ("DMA") engines. A direct memory access engine is a circuit that is configured to access one or more memories by generating access requests (such as read or write requests). In the device 200, these accesses include reading the state data from the functional elements for the situation in which such functional elements are powered down, and writing the state data to the functional elements to restore the functional elements to a powered-up state.

As described elsewhere herein, it is possible that for any particular functional unit, the data that is to be saved by the save-state helpers is located in different memories and/or at non-contiguous blocks of the same memory. The save-state helpers pack this data, so that even though disparate accesses are sometimes made between the save-state helpers and the functional elements, accesses from the save-state helpers to the memory 215 are contiguous. Generally, contiguous accesses are faster than non-contiguous accesses, and thus the total time to transmit state data between the memory 215 and the save-state helpers is reduced as compared with a system in which the functional units save their own state to the memory 215.

Figure 3:
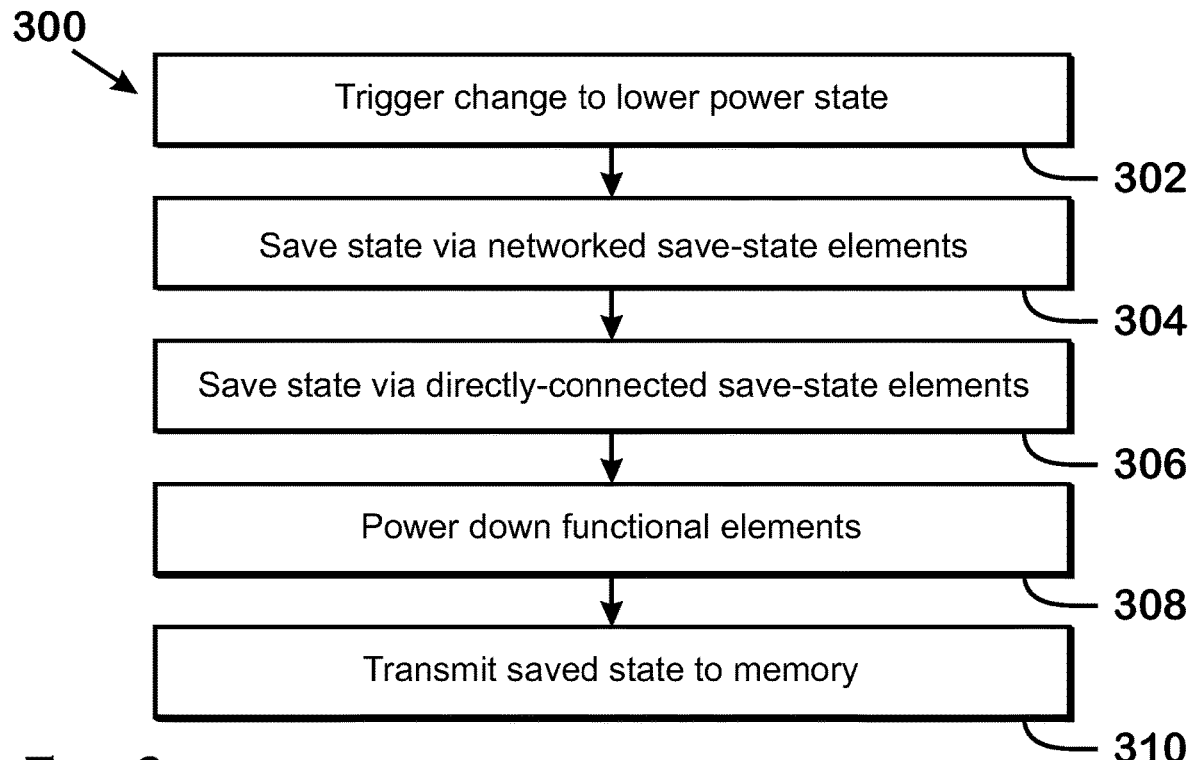
FIG. 3 is a flow diagram of a method for saving state for a device, according to an example.

FIG. 3 is a flow diagram of a method 300 for saving state for a device 200, according to an example. Although described with respect to the system of FIGS. 1 and 2, those of skill in the art will understand that any system configured to perform the steps of the method 300 in any technically feasible order falls within the scope of the present disclosure.

At step 302, a power state controller 216 triggers a transition for the device 200 to a lower power state, from a current power state. In the lower power state, at least one of the functional elements of the device 200 is in a low power state and is thus unable to retain certain state. In some examples, the transition causes at least a latency-sensitive functional element 202 and a non-latency-sensitive functional element 204 to be placed into a state in which such functional elements are unable to retain state.

At step 304, networked save-state helpers 212 save state of one or more non-latency sensitive functional elements 204. As described elsewhere herein, it is possible for the state that is saved to be located in different memories of a functional element and/or in non-contiguous portions of a single memory of a functional element. In some examples, the networked save-state elements 212 save such state into internal memory 213 that is internal to the networked save-state elements 212. At step 306, one or more save-state elements 210 saves state from one or more latency-sensitive functional elements 202. As described elsewhere herein, each save-state element 210 is directly connected to a latency-sensitive functional element 202 without a networking element 214. As with the non-latency sensitive functional elements 204, it is possible for the state that is saved to be located in different memories of a functional element and/or in non-contiguous portions of a single memory of a functional element. It should be understood that steps 304 and 306 can be done concurrently. More specifically, because the various save-state units are independent, it is possible for the save-state units that service non-latency-sensitive functional elements 204 and the save-state units that service latency-sensitive functional units to operate in overlapping time periods. In some examples, however, the state save operation begins later for the latency-sensitive functional elements 202, since such functional elements have need for a lower amount of downtime. More specifically, as described elsewhere herein, the networked save-state elements 212 operate slower than the non-networked save-state elements 210. This means that the latency sensitive functional elements 202 are able to have greater up-time than the non-latency-sensitive functional elements 204, since the save-state helpers 210 can begin the state-save operation later than the networked save-state helpers 212. This greater up-time is necessary for some or all of the latency-sensitive functional elements 202.

At step 308, the functional elements—latency-sensitive functional elements 202 and non-latency-sensitive functional elements 204—power down. This power-down occurs once state is saved. It is not necessary for the different functional elements to power down at the exact same time, though it is possible that at least some such functional elements power down at the same time. At step 310, the save-state units transmit the state data to memory and then power down. It is possible for step 310 to occur while any of steps 304, 306, or 308 are occurring. More specifically, once any particular save-state unit has received state data from a corresponding functional unit, that save-state unit is ready to transmit such state data to the memory 215. In some examples, such save-state units transmit their data to the memory 215 as soon as there is available bandwidth between the save-state unit and the memory 215. In some examples, the memory 215 is within the power-state controller 216 and thus remains powered on while the functional elements are powered down.

Figure 4:
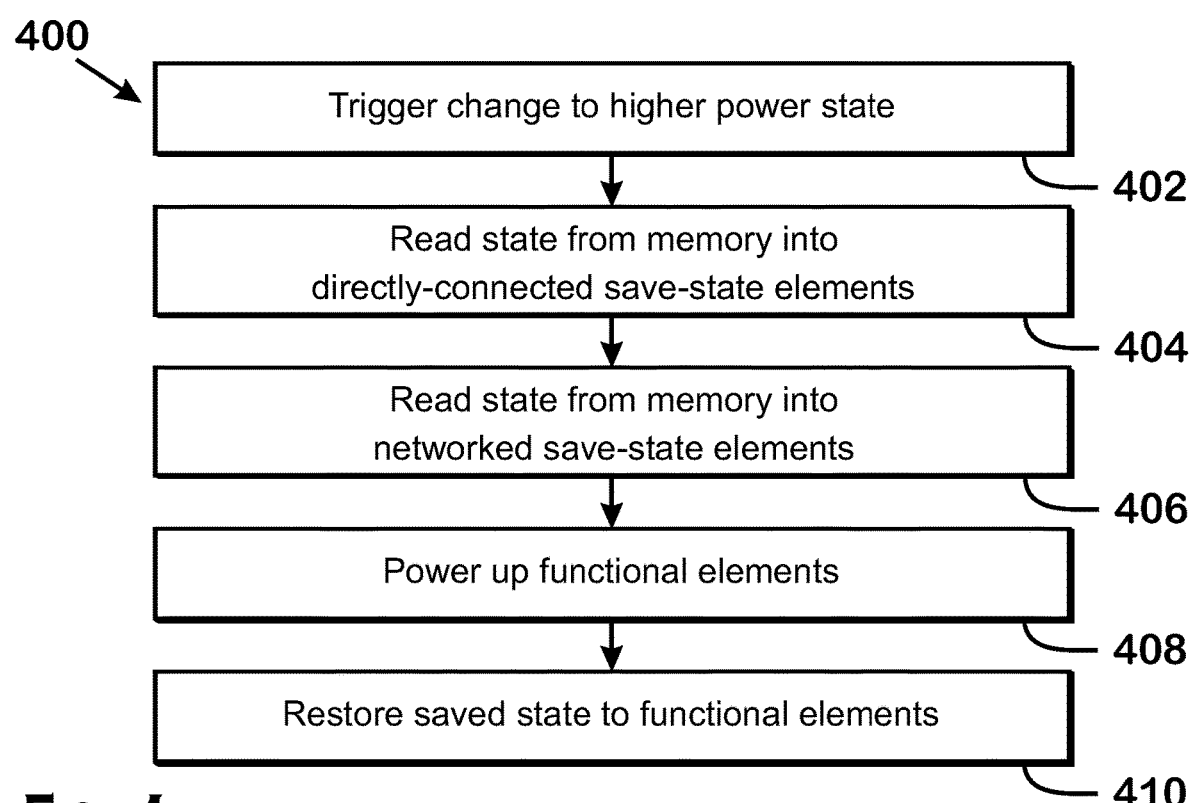
FIG. 4 is a flow diagram of a method for restoring state for a device, according to an example.

FIG. 4 is a flow diagram of a method 400 for restoring state, according to an example. Although described with respect to the system of FIGS. 1 and 2, those of skill in the art will understand that any system configured to perform the steps of the method 400 in any technically feasible order falls within the scope of the present disclosure.

At step 402, a power state controller 216 triggers a transition for the device 200 to a higher power state, from a current power state. In the current power state, state data for the functional elements is not stored in the functional elements, but is stored in the memory 215. In the higher power state, the functional elements are powered up and require that state data.

At step 404, the save-state helpers 210 read state data from the memory 215 into the internal memory 211. At step 406, the networked save-state helpers 212 read state data from the memory 215 into the internal memory 213. At step 408, the functional elements power up. At step 410, the save-state units provide the state data to the functional elements. In some implementations, steps 404, 406, and 408 are be performed concurrently. In some implementations, restoring state to the latency-sensitive functional elements 202 occurs before state is able to be restored to the non-latency-sensitive functional elements 204. This timing occurs by virtue of the fact that the latency-sensitive functional elements 202 operate with less downtime than the non-latency-sensitive functional elements 204, and are thus serviced by the save-state helpers 210, which are able to restore state more quickly than the networked save-state helpers 212, as described elsewhere herein.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the latency-sensitive functional elements 202, the non-latency-sensitive functional elements 204, the state elements 206, the state elements 208, the save-state helpers 210, the internal memory 211, the networking elements 214, the networked save-state helpers 212, the internal memory 213, the power state controller 216, and the memory 215) may be implemented as a hardware electronic circuit, a general purpose computer, a processor, or a processor core, as a program, software, or firmware, stored in a non-transitory computer readable medium or in another medium, executable by a general purpose computer, a processor, or a processor core, or as a combination of two or more of a processor, a circuit, or software. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   triggering a change for a first set of one or more functional elements and for a second set of one or more functional elements from a high-power state to a low-power state;
   saving a first state of the first set of one or more functional elements via a first set of one or more save-state elements;
   saving a first state of the second set of one or more functional elements via a second set of one or more save-state elements;
   powering down the first set of one or more functional elements and the second set of one or more functional elements before or concurrently with the first state of the first set and the first state of the second set being saved into the one or more save-state elements; and
   transmitting the first state of the first set of one or more functional elements and the first state of the second set of one or more functional elements to a memory.

2. The method of claim 1, wherein the memory remains powered up while the first set of one or more functional elements and the second set of one or more functional elements are powered down.

3. The method of claim 1, wherein the first set of one or more functional elements comprise a set of functional elements that are latency-sensitive.

4. The method of claim 3, wherein the first set of one or more functional elements are directly coupled, without an intervening network, to the first set of one or more save-state elements.

5. The method of claim 4, wherein the second set of one or more functional elements are coupled to the second set of one or more save-state elements via one or more networking elements.

6. The method of claim 3, wherein saving the first state of the first set of one or more functional elements begins later than saving the first state of the second set of one or more functional elements.

7. The method of claim 1, wherein saving the first state of the first set of one or more functional elements and saving the first state of the second set of one or more functional elements occur concurrently.

8. The method of claim 1, wherein transmitting the first state of the first set of one or more functional elements and the first state of the second set of one or more functional elements to memory occurs concurrently with powering down the first set of one or more functional elements and the second set of one or more functional elements.

9. The method of claim 1, further comprising powering down the first set of one or more save-state elements and the second set of one or more save-state elements after transmitting the first state of the first set of one or more functional elements and the first state of the second set of one or more functional elements to memory.

10. A system, comprising:
    a power state controller;
    one or more save-state elements;
    one or more functional elements; and
    a memory, wherein the power state controller is configured to trigger a change for a first set of the one or more functional elements and for a second set of the one or more functional elements from a high-power state to a low-power state, wherein a first set of the one or more save-state elements are configured to save a first state of the first set of one or more functional elements, wherein a second set of the one or more save-state elements are configured to save a first state of the second set of one or more functional elements, wherein the first set of one or more functional elements and the second set of one or more functional elements are configured to power down before or concurrently with the first state of the first set and the first state of the second set being saved into the one or more save-state elements, and wherein the first set of the one or more save-state elements are configured to transmit the first state of the first set of the one or more functional elements to the memory and the second set of the one or more save-state elements are configured to transmit the first state of the second set of the one or more functional elements to the memory.

11. The system of claim 10, wherein the memory remains powered up while the first set of one or more functional elements and the second set of one or more functional elements are powered down.

12. The system of claim 10, wherein the first set of one or more functional elements comprise a set of functional elements that are latency-sensitive.

13. The system of claim 12, wherein the first set of one or more functional elements are directly coupled, without an intervening network, to the first set of one or more save-state elements.

14. The system of claim 13, wherein the second set of one or more functional elements are coupled to the second set of one or more save-state elements via one or more networking elements.

15. The system of claim 12, wherein saving the first state of the first set of one or more functional elements begins later than saving the first state of the second set of one or more functional elements.

16. The system of claim 10, wherein saving the first state of the first set of one or more functional elements and saving the first state of the second set of one or more functional elements occur concurrently.

17. The system of claim 10, wherein transmitting the first state of the first set of one or more elements and the first state of the second set of one or more functional elements to memory occurs concurrently with powering down the first set of one or more functional elements and the second set of one or more functional elements.

18. The system of claim 10, wherein the first set of one or more save-state elements and the second set of one or more save-state elements are configured to power down after transmitting the first state of the first set of one or more functional elements and the first state of the second set of one or more functional elements to memory.

19. A system comprising:
a power state controller; and
one or more save-state elements,
wherein the power state controller is configured to trigger a change for a first set of one or more functional elements and for a second set of one or more functional elements from a high-power state to a low-power state, wherein a first set of the one or more save-state elements are configured to save a first state of the first set of one or more functional elements, wherein a second set of the one or more save-state elements are configured to save a first state of the second set of one or more functional elements, wherein the first set of one or more functional elements and the second set of one or more functional elements are configured to power down before or concurrently with the first state of the first set and the first state of the second set being saved into the one or more save-state elements, and wherein the first set of the one or more save-state elements are configured to transmit the first state of the first set of the one or more functional elements to a memory and the second set of the one or more save-state elements are configured to transmit the first state of the second set of the one or more functional elements to the memory.

20. The system of claim 19, wherein the memory remains powered up while the first set of one or more functional elements and the second set of one or more functional elements are powered down.

* * * * *